US011454286B2

(12) United States Patent
Bettenhausen

(10) Patent No.: US 11,454,286 B2
(45) Date of Patent: Sep. 27, 2022

(54) INLINE COUPLER

(71) Applicant: Nebraska Irrigation, Inc., Columbus, NE (US)

(72) Inventor: Roger V. Bettenhausen, Columbus, NE (US)

(73) Assignee: NEBRASKA IRRIGATION, INC., Columbus, NE (US)

(*) Notice: Subject to any disclaimer, the term of this patent is extended or adjusted under 35 U.S.C. 154(b) by 206 days.

(21) Appl. No.: 16/657,779

(22) Filed: Oct. 18, 2019

(65) Prior Publication Data

US 2020/0124110 A1   Apr. 23, 2020

Related U.S. Application Data

(60) Provisional application No. 62/747,507, filed on Oct. 18, 2018.

(51) Int. Cl.
| F16D 1/08 | (2006.01) |
| F16D 3/38 | (2006.01) |
| F16B 2/06 | (2006.01) |
| F16D 3/68 | (2006.01) |
| A01G 25/09 | (2006.01) |

(52) U.S. Cl.
CPC .......... *F16D 1/0864* (2013.01); *F16D 3/387* (2013.01); *F16D 3/68* (2013.01); *A01G 25/092* (2013.01); *F16B 2/065* (2013.01); *F16B 2200/506* (2018.08)

(58) Field of Classification Search
CPC .. F16B 2/065; F16B 2200/506; F16D 1/0864; F16D 3/387; F16D 3/56; F16D 3/58; F16D 3/64; F16D 3/68; F16D 3/76; F16D 3/78; Y10T 403/7062; Y10T 403/7067

USPC ............ 464/73, 92, 93, 182; 403/373, 374.3
See application file for complete search history.

(56) References Cited

U.S. PATENT DOCUMENTS

| 3,405,760 A | 10/1968 | Smith |
| 3,837,179 A | 9/1974 | Barth |
| 3,867,050 A | 2/1975 | Pitner |

(Continued)

FOREIGN PATENT DOCUMENTS

| DE | 10054384 A1 | 5/2002 | |
| DE | 202013101844 U1 * | 5/2013 | ............... F16D 3/68 |

OTHER PUBLICATIONS

International Preliminary Report on Patentability in related PCT Application No. PCT/US2019/057048, dated Apr. 14, 2021.

(Continued)

*Primary Examiner* — Josh Skroupa
(74) *Attorney, Agent, or Firm* — Greer Burns & Crain, Ltd.

(57) ABSTRACT

A yoke assembly for receiving a shaft, the yoke assembly including a main section including a pair of planar surfaces and a shoulder portion; and a subsidiary section with a pair of planar surfaces extending between a proximal wall and a distal wall. The subsidiary section is configured and arranged to be seated and securely attached to the first main section such that the proximal wall of the subsidiary section opposes the shoulder portion of the main section, and the pair of planar surfaces of the main section oppose the pair of planar surfaces of the subsidiary section. The main section and the subsidiary section are configured and arranged to be joined together to form a receiving aperture therebetween.

19 Claims, 16 Drawing Sheets

(56) References Cited

U.S. PATENT DOCUMENTS

| | | | |
|---|---|---|---|
| 4,350,295 A | 9/1982 | Gheen | |
| 4,460,290 A * | 7/1984 | Mallet | F16D 1/0864 403/373 |
| 4,787,878 A * | 11/1988 | Nikkei | F16D 3/76 464/152 |
| 4,840,194 A * | 6/1989 | Berry | H02G 3/06 138/109 |
| 5,221,232 A | 6/1993 | Nameny | |
| 5,678,772 A | 10/1997 | Bettenhausen | |
| 5,746,659 A | 5/1998 | Lindenthal | |
| 6,527,233 B2 * | 3/2003 | Maurice | F16D 1/0864 403/373 |
| 6,561,723 B2 * | 5/2003 | McCurdy | A61D 19/00 403/312 |
| 6,755,363 B2 | 6/2004 | Weatherl et al. | |
| 6,840,862 B2 | 1/2005 | Daniel | |
| 6,969,321 B2 * | 11/2005 | Erlmann | F16D 3/387 403/364 |
| 7,695,262 B2 | 4/2010 | Refenius et al. | |
| 7,938,343 B2 | 5/2011 | Vorderstrasse et al. | |
| 8,257,184 B1 | 9/2012 | Cordes et al. | |
| 8,469,830 B2 * | 6/2013 | Zhao | F16D 3/387 464/151 |
| 8,602,154 B2 | 12/2013 | Iwasa et al. | |
| 9,022,872 B2 * | 5/2015 | Daniel | F16D 3/68 464/73 |
| 2003/0063948 A1 * | 4/2003 | Liu | F16D 1/0864 403/344 |
| 2004/0097291 A1 | 5/2004 | Erlmann | |
| 2008/0234056 A1 | 9/2008 | Grawenhof | |
| 2009/0143147 A1 | 6/2009 | Kubota et al. | |
| 2015/0298733 A1 | 10/2015 | Moriyama et al. | |
| 2015/0329139 A1 | 11/2015 | Kakutani et al. | |
| 2017/0037910 A1 | 2/2017 | Schwartz et al. | |
| 2017/0082154 A1 | 3/2017 | Reel, Jr. et al. | |

OTHER PUBLICATIONS

International Search Report and Written Opinion in related PCT Application No. PCT/US2019/057048, dated Jan. 9, 2020.

* cited by examiner

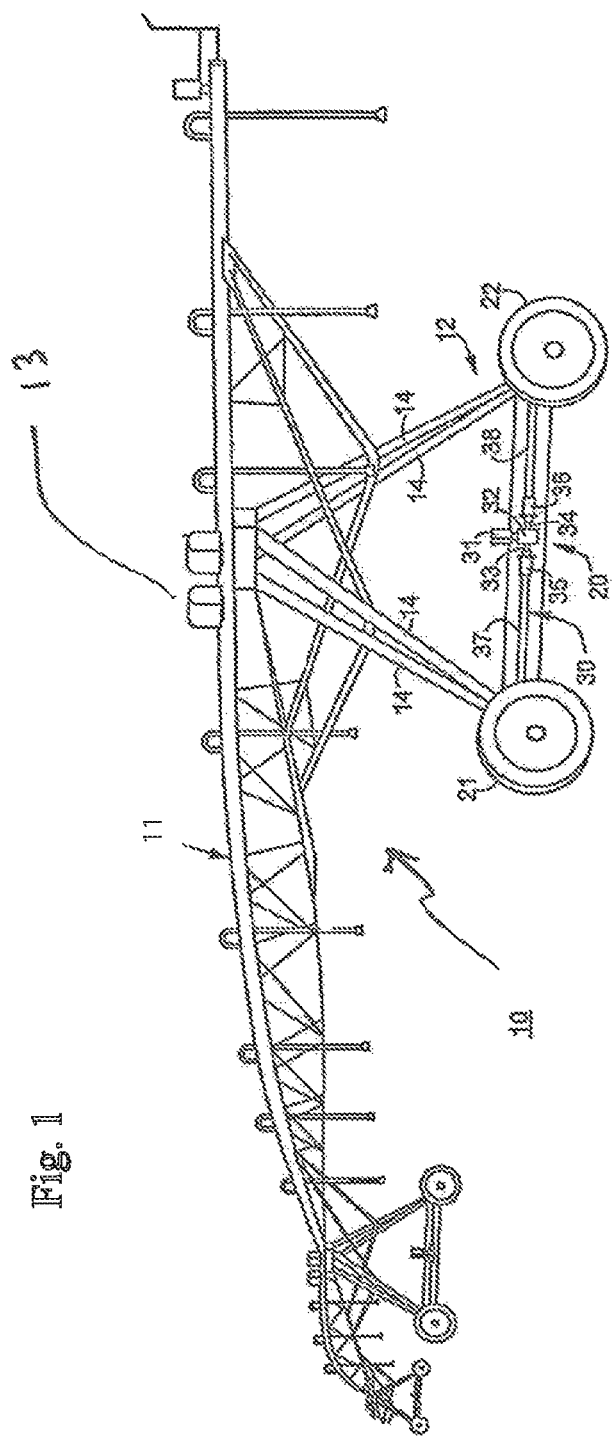

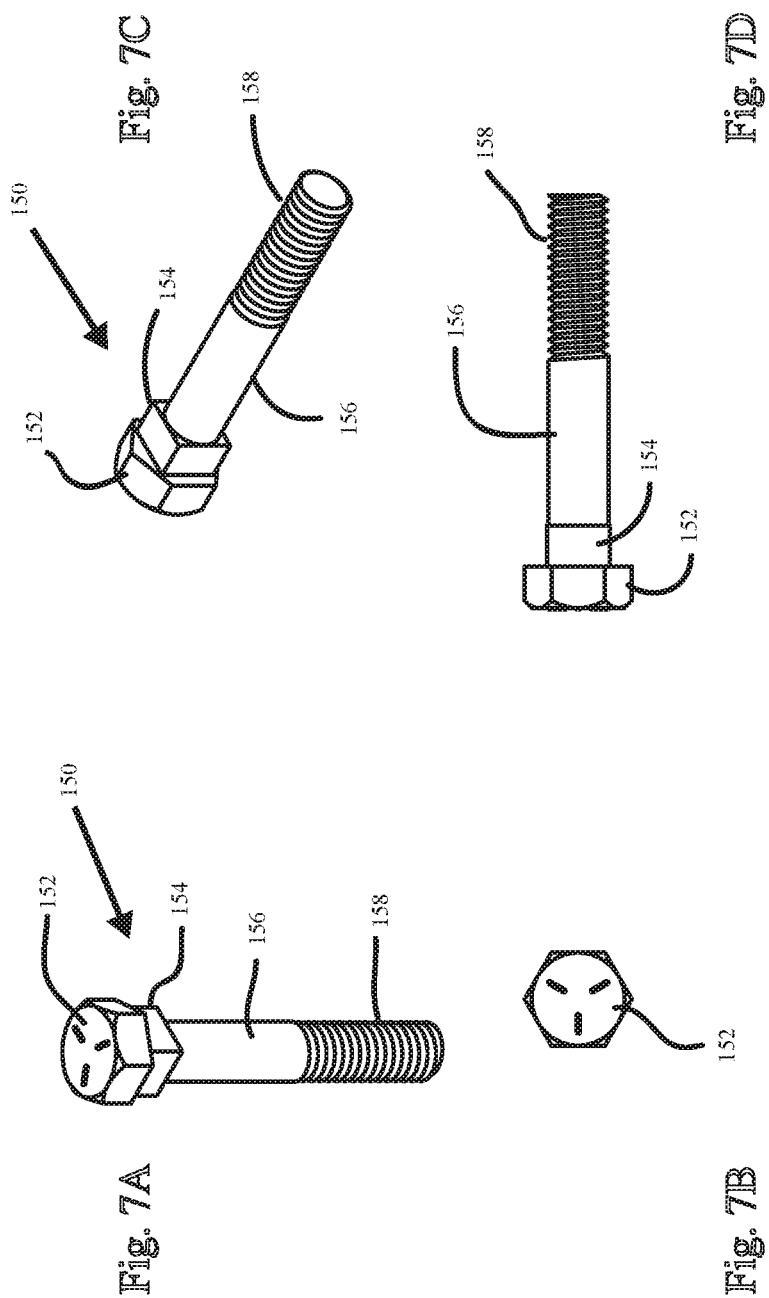

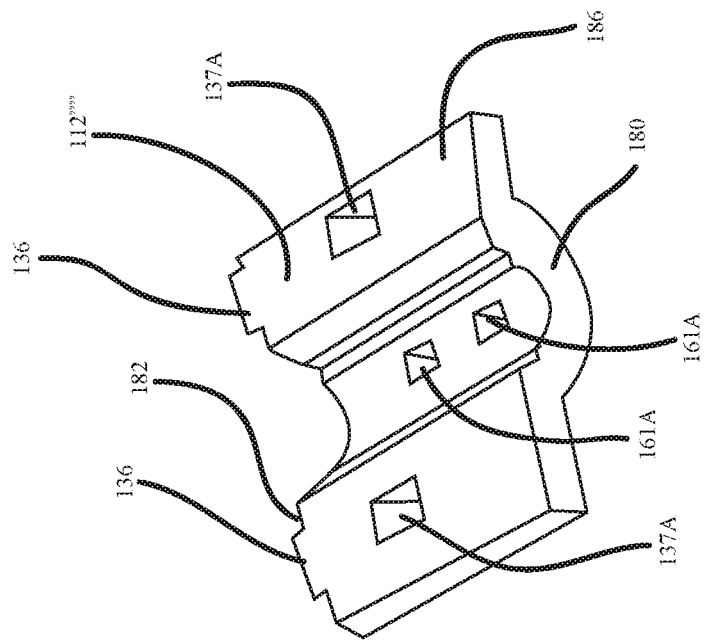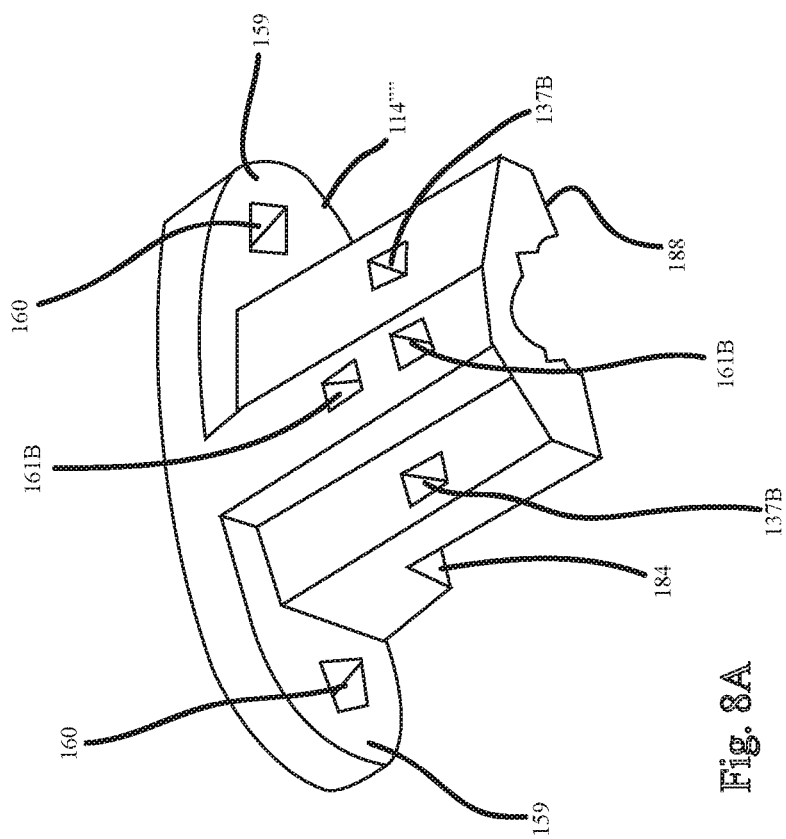

INLINE COUPLER

An inline coupler configured and arranged for connecting an input drive shaft to an output driven shaft. The coupler includes first and second yoke assemblies respectively coupled to the input drive shaft and the output driven shaft.

BACKGROUND OF THE INVENTION

1. Field of the Invention

The present invention relates generally to the field of couplers of the type used for connecting a driving shaft member to a driven shaft member and, more particularly, to a universal coupler for use in coupling power to drive wheels in irrigation systems.

2. Description of the Prior Art

Overhead irrigation systems include two basic types—those with a center pivot wherein the support structure moves in a circle, and those which move in line across a field. The latter type are known in the art as "lateral move" systems. The present invention is equally applicable to these and other irrigation systems, as persons in this art will readily appreciate. However, the invention will be illustrated in the context of a center pivot system.

Thus, reference numeral 10 in FIG. 1 designates a center pivot irrigation system having a line of water pipes 11 with sprinklers spaced along their length. The pipes 11 are supported above the ground upon spaced, mobile, self-propelled towers 12, as is well known. The pipeline is pivotally mounted at an inner end (the center) near the well or water source so that the succession of towers 12 travel in circles around the well to irrigate a relatively large circular area. Thus, a "center pivot" irrigation system travels a full circle. The system can be stopped at any given point in the field. Control is by way of a main panel mounted at the center pivot point.

The towers 12 are individually motor-driven and flexibly joined to pipe lengths 11 and to each other by flexible joint members 13 and arms 14 disposed on either side thereof. Each tower 12 is defined at a base thereof by a tower leg assembly 20, including a front wheel 21 and a rear wheel 22 coupled to a motor drive system having a drive shaft assembly 30 extending in the direction of travel.

The drive system includes an electric motor 31 mounted to a center gear box 32. The center gearbox 32 drives front and rear drive wheel gear boxes (not shown) which are directly bolted to the front and rear drive wheels 21, 22, respectively. The center gearbox 32 has round outboard shafts 33, 34 that extend out its front and rear end-sides and connect to associated front and rear drive shaft engaging couplers 35, 36 which couple to the proximal ends of associated front and rear square drive shafts 37, 38, typically of ¾", ⅞", or 1" square dimensions. The opposite or distal ends of the front and rear drive shafts 37, 38 drive the associated outboard round shafts on the front and rear drive wheel gear boxes. Drive wheel engaging couplers (not shown), are used to couple the distal square cross-section ends of the shafts 37, 38 to the round cross-section ends of the shafts extending from the drive wheel gear boxes (not shown). All in all, therefore, each tower leg assembly 20 typically consists of four couplers.

Because the drive wheel engaging couplers are subject to heavy load stresses during irrigation over rocky or differing grade soil conditions, these couplers are designed to be flexible and shock absorbing and come in a wide variety of specific sizes.

Typically, heavy duty shock-absorbing couplers consist of two pair of unique interlocking castings, where one of the pairs capsulates therebetween the outboard shaft of a drive wheel gear box, which is round in cross-section, and the other pair capsulates the driving end of the square drive shaft which is driven by the motor-driven center gear box 32.

The interlocking castings are constructed so as to clamp around, using screws or the like, the associated shaft end seated therebetween. While there are couplers of unitary construction which are more simple in construction than couplers consisting of interlocking castings, castings have been shown to be highly flexible and shock absorbing and better at tolerating the rough travelling conditions which towers 12 are subjected to as they are driven over an area of land with differing grades.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a perspective view of a center pivot irrigation system with sprinkler-carrying pipe lengths supported by upstanding towers taken from the periphery of the circular path of the system;

FIG. 5A shows the upper portion and FIG. 5B shows the lower portion of this first variation;

FIG. 6A shows the upper portion and FIG. 6B shows the lower portion of this second variation;

FIGS. 7A-7D show various views of a bolt that can be used for attaching the upper and lower portions of the yoke assembly together;

FIG. 8A is a perspective view of an upper section of another embodiment of the yoke assembly of the present invention;

FIG. 8B is a perspective view of a lower section of the yoke assembly associated with the upper section of the embodiment of FIG. 8A;

FIG. 8E is a front view of the insert and FIG. 8F is a side view.

DETAILED DESCRIPTION OF THE PREFERRED EMBODIMENTS

Figure 2A:
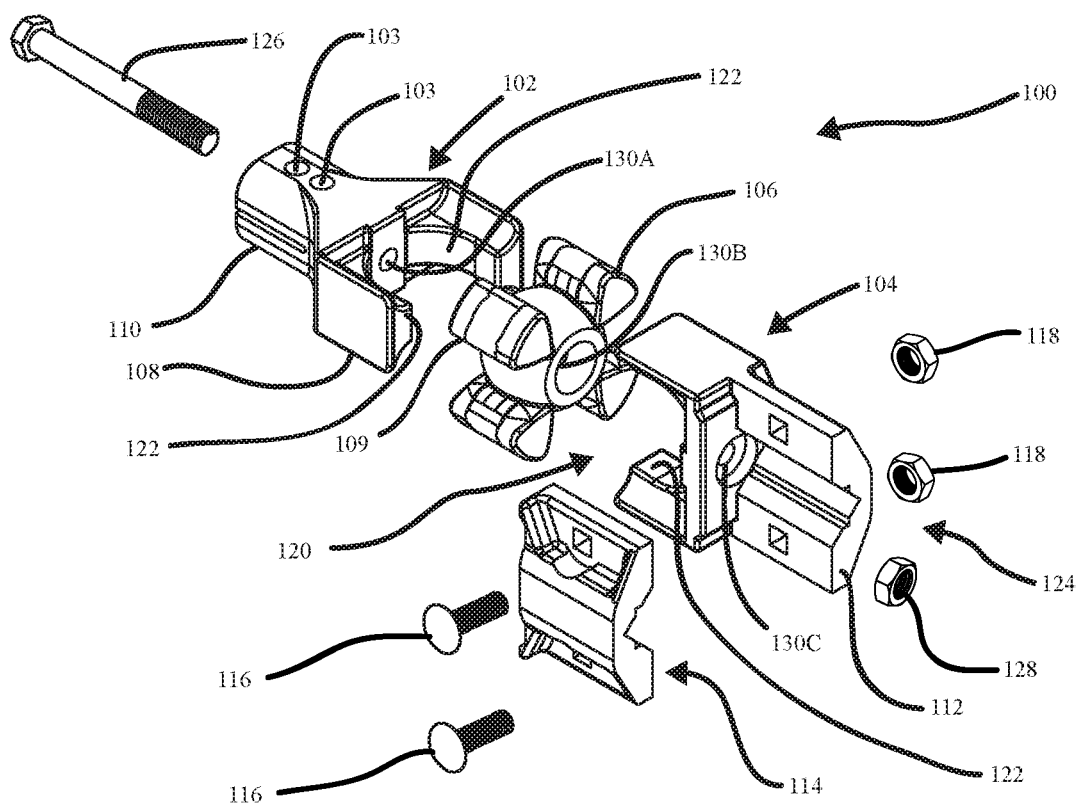
FIG. 2A is an exploded view of a first embodiment of an inline universal coupler configured for connecting an end of a square drive shaft to an end of a round outboard shaft of a drive wheel gear box in accordance with the present invention.
Figure 2B:
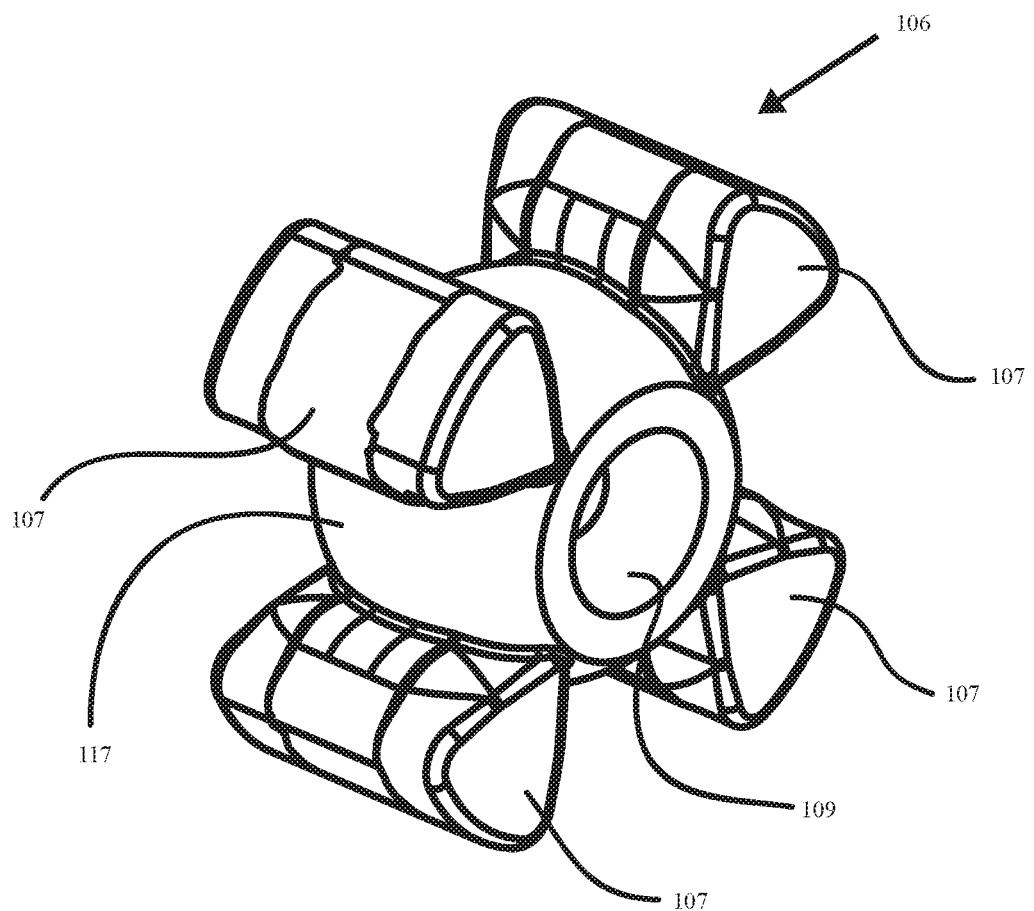
FIG. 2B is a perspective view of the resilient insert of FIG. 2A.
Figure 2C:
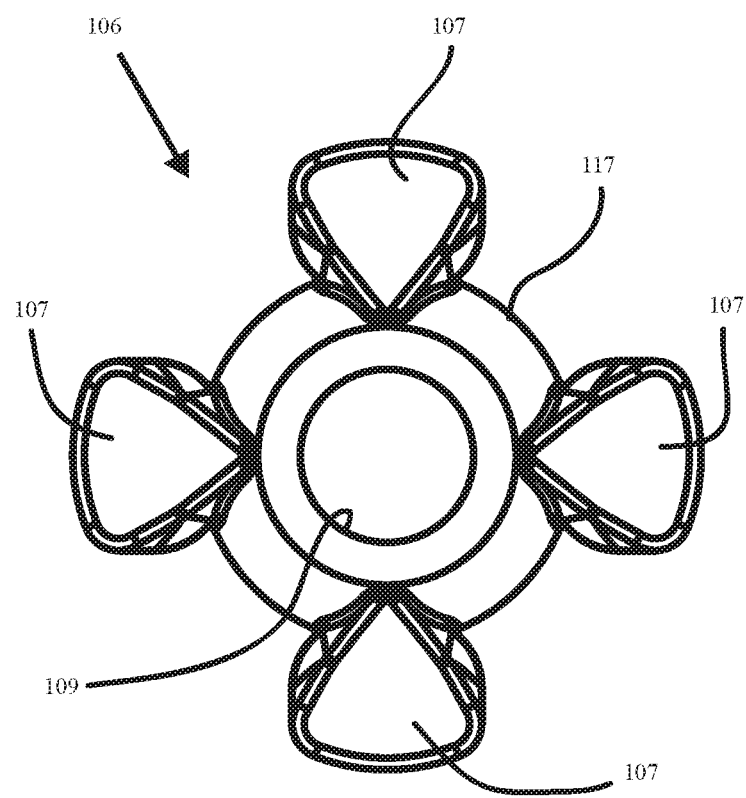
FIG. 2C is a front view of the resilient insert of FIG. 2B.

Referring to FIG. 2A, there is illustrated an inline universal coupler 100 constructed in accordance with and embodying the features of the present invention. This coupler 100 includes a first yoke assembly 102 for connecting with a first shaft, such as a driving shaft of round cross section (not shown), a second yoke assembly 104 for connecting with a second shaft, such as a driven shaft of square cross section (not shown), and a multi-lobed compressible resilient insert 106 provided therebetween. The first and second yoke assemblies of this embodiment, as well as those of the other embodiment, are made of any suitable material, such as aluminum, steel, iron, or other metal or material. As can be seen in FIGS. 2B and 2C, the insert includes four lobes 107, where each lobe 107 is generally triangular and projects radially outwardly from a central portion 117. Other shapes for the lobes 107 are also contemplated. The central portion 117 can be barrel-shaped, in the form of a truncated sphere, or the radially outer peripheral walls of the central portion 117 may be of any other suitable shape. Additionally, the central portion 117 also preferably includes a concavity 109 on each axial side thereof. The insert 106 of this embodiment, as well as the inserts of the other embodiments, is made of any suitable material, such as natural or artificial rubber, or a high strength resin.

The first yoke assembly 102 includes a forked section 108 for mating with insert 106 between two of the pairs of lobes 107 and a receiving section 110 for receiving the driving shaft. The receiving section 110 preferably includes at least one (two shown) aperture 103 for securing the driving shaft via one or more associated pins/bolts (not shown) that are configured and arranged to extend laterally through associated apertures 103 in the round driving shaft.

The second yoke assembly 104 is configured out of two sections, a main (or bottom) section 112 and a subsidiary (or top) section 114, which two sections are connected together by any desired fastening means, such as the pair of bolts 116 and the associated pair of nuts 118 that are received through the associated pair of apertures in both components (112 and 114). The second yoke assembly 104 also includes a forked section 120 for mating with insert 106 between the other two pairs of lobes 107 and a receiving section 124 for receiving the driven shaft, which in this embodiment has a square cross-section. The interior surfaces 122 of the forked sections of both yoke assemblies are preferably configured to be curved or otherwise correspond to the outer peripheral surface of the central portion 117 (FIG. 2B) of the insert 106 where surfaces 122 of the forked sections are in contact with the outer surfaces of the central portion 117 of the insert 106.

Figure 3:
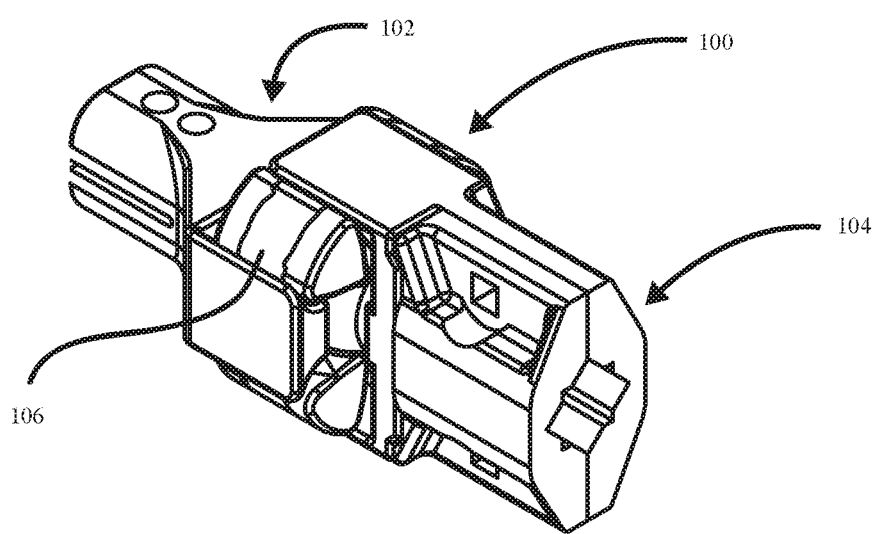
FIG. 3 is an assembled view of the inline universal coupler of FIGS. 2A-2C.

Ac can be seen in FIG. 2A, this embodiment is also provided with an axial bolt 126 and a corresponding nut 128 that are configured and arranged to pass through an axial aperture 130A/130B/130C that passes completely through the coupler 100, such that the coupler can be assembled and secured together into the assembly shown in FIG. 3. It should be noted that in the embodiment depicted in FIG. 2A, the first yoke assembly 102 may also be configured with a main section and a subsidiary section, similar to the main and subsidiary sections (112, 114) of the second yoke assembly 104.

Figure 4A:
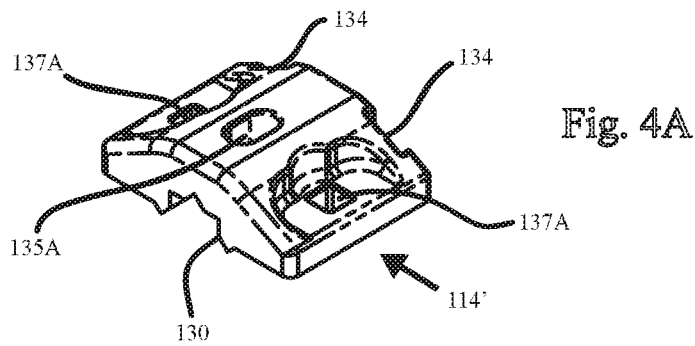
FIG. 4A is a perspective view of an upper portion of a yoke assembly of a second embodiment of the present invention.
Figure 4B:
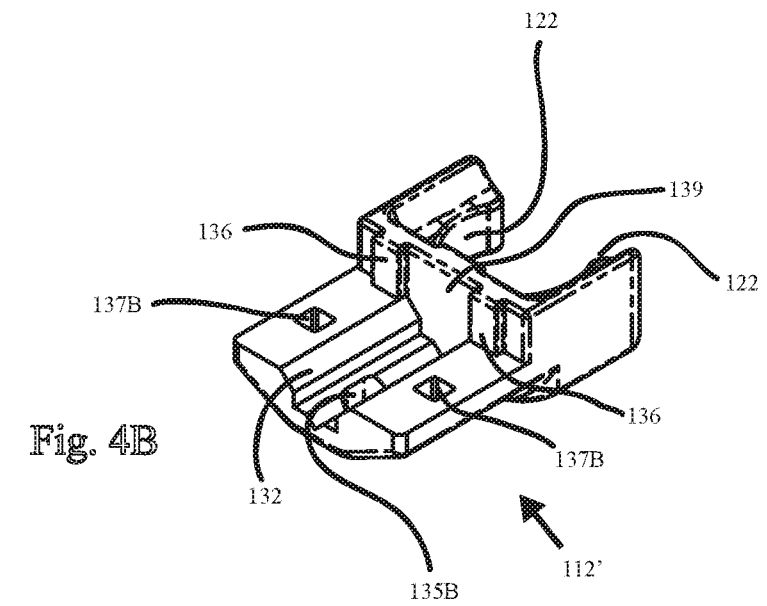
FIG. 4B is a perspective view of a lower portion of the same yoke assembly.

Turning now to FIGS. 4A and 4B, a second embodiment of a yoke assembly of the present invention is shown. In particular, FIG. 4A shows a second embodiment of a top section 114' and FIG. 4B shows a second embodiment of a bottom section 112', where the sections 112' and 114' can be assembled together with a fastening means (such as screws and bolts) to form a yoke assembly that can be used in place of yoke assembly 104 or yoke assembly 102 of FIGS. 2A and 3. Features not discussed herein are the same, or very similar, as those provided in yoke assembly 104 of FIGS. 2A and 3.

Figure 4C:
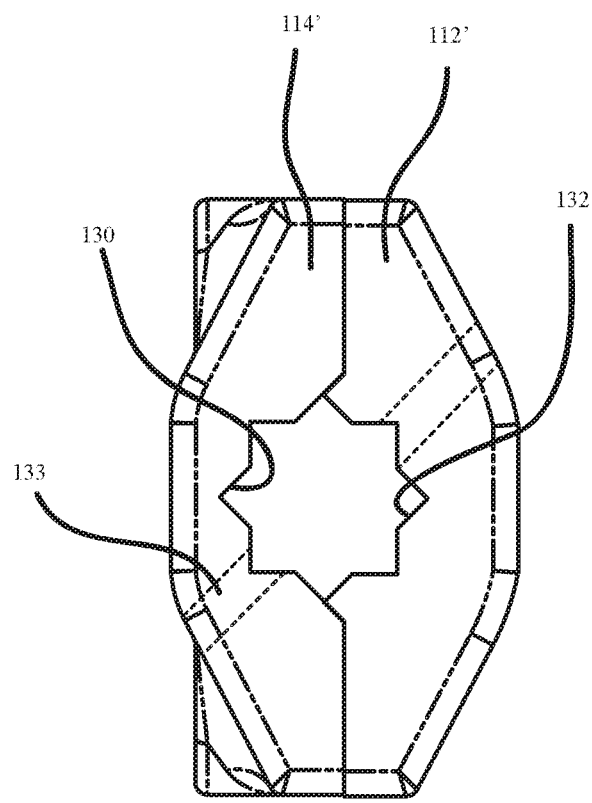
FIG. 4C is a front view of the same yoke assembly shown with the upper and lower sections joined together.

One of the differences between the yoke assembly formed when top section 114' (FIG. 4A) and bottom section 112' (FIG. 4B) are combined together and the yoke assembly 104 of FIGS. 2A and 3 is that in the yoke assembly of FIGS. 4A and 4B, the receiving aperture for receiving the square driven shaft is configured for receiving a shaft of square cross-section in either of two different orientations (i.e., a first orientation and a second orientation rotated by 45 degrees from the first orientation). Specifically, when the sections 112' and 114' are joined together, as shown in FIG. 4C, the receiving aperture formed by upper receiving aperture surfaces 130 (FIG. 4A) and lower receiving aperture surfaces 132 (FIG. 4B) can receive a shaft of a square cross-section with outer faces aligned vertically and horizontally (in the view of the drawings), or the shaft of square cross-section can be rotated by 45 degrees so that the outer faces of the shaft are inclined at 45 degrees with respect to the vertical and horizontal (in the view of the drawings). Optionally, the embodiment of FIG. 4C may include an angled aperture 133 passing through both sections 112' and 114' (additionally, a second angled aperture (not shown) may also optionally be provided on the opposite side, perpendicular to angled aperture 133). A bolt or pin may be passed through the angled aperture 133 for securing a shaft of square cross-section when the shaft is rotated by 45 degrees, which allows for the shaft to include a transverse through hole extending through opposite parallel surfaces, instead of requiring that a through hole be drilled through the corners of the shaft. Although not shown in FIG. 4C, vertically extending aligned oval apertures 135A, 135B (FIGS. 4A and 4B), described below, may also be provided in addition to angled aperture 133.

Another difference between the yoke assembly of FIGS. 4A/4B and the yoke assembly 104 of FIG. 2A is that the yoke assembly of FIGS. 4A/4B includes a pair of alignment notches 134 in top section 114' (FIG. 4A) and a pair of corresponding alignment projections 136 in an intermediate wall 139 of the bottom section 112' for aiding in the aligning of the two components together before they are bolted or otherwise fastened together. It should be noted that the locations of the alignment projections and notches may be reversed (i.e., the notches could be formed on the wall 139 and the projections could be formed on subsidiary section 114'). The yoke assembly of FIGS. 4A and 4B also includes a pair of aligned oval apertures 135A and 135B, which a configured and arranged to receive a bolt or pin for maintaining the shaft within the receiving aperture that receives the shaft (i.e., the bolt or pin keeps the shaft from separating from the yoke in the axial direction, or from being removed from the yoke). As a variation on the oval apertures 135A/135B, a pair of square apertures aligned in the axial direction (such as apertures 161A/161B of FIGS. 8A and 8B), but offset from the side apertures 137A/137B, may be provided. Of course, other means of maintaining the shaft within the yoke are also contemplated, and thus oval apertures 135A/135B are optional. Further, although the side apertures 137A/137B are shown of square configuration, other shapes, such as round, may be utilized.

Figure 5A:
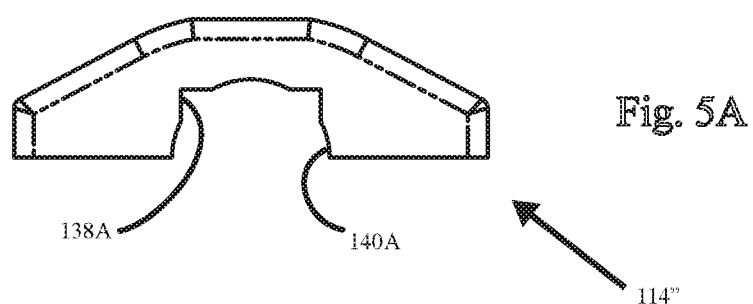
FIGS. 5A and 5B are a first variation on the yoke assembly of FIGS. 4A and 4B, where
Figure 5B:
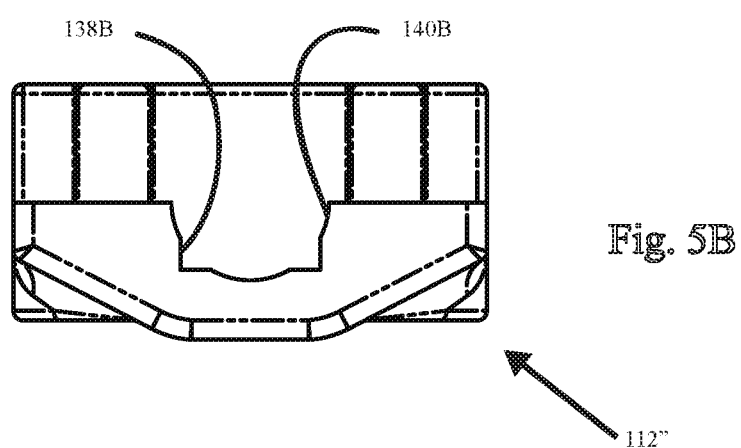

Turning now to FIGS. 5A and 5B, a variation on the on the yoke assembly of FIGS. 4A/4B is provided, with the primary different being related to the receiving aperture. FIG. 5A shows a top section 114" and FIG. 5B shows a bottom section 112". When sections 112" and 114" are assembled together, a receiving aperture is formed that can accommodate a shaft of circular cross-section or a shaft of square cross-section. Thus, the yoke assembly formed by the components of FIGS. 5A and 5B could be substituted for the first yoke assembly 102 of FIGS. 2A and 3 or for the second yoke assembly 104 of FIGS. 2A and 3. More specifically, FIG. 5A shows how top section 114" includes upper square receiving surfaces 138A and upper circular receiving surfaces 140A, and FIG. 5B shows how bottom section 112" includes lower square receiving surfaces 138B and lower circular receiving surfaces 140B.

Figure 6A:
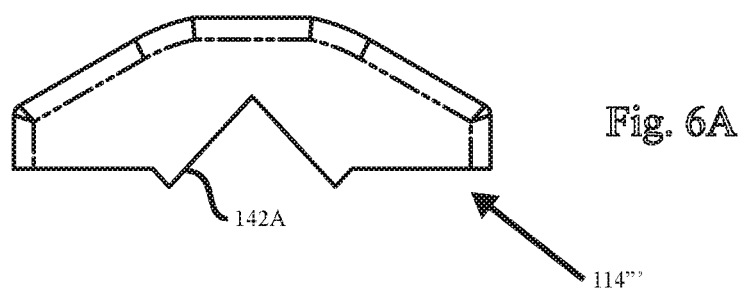
FIGS. 6A and 6B are a second variation on the yoke assembly of FIGS. 4A and 4B, where
Figure 6B:
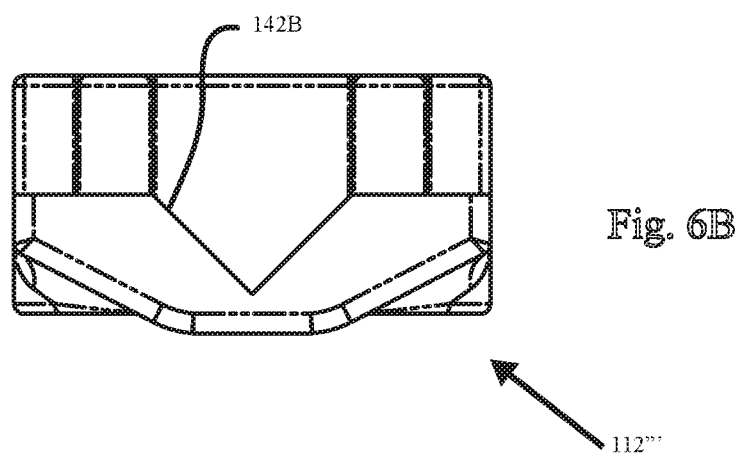

Turning now to FIGS. 6A and 6B, a variation on the on the yoke assembly of FIGS. 5A/5B is provided, with the primary different being related to the receiving aperture. FIG. 6A shows a top section 114'" and FIG. 6B shows a bottom section 112'". When sections 112'" and 114'" are assembled together, a receiving aperture is formed that can accommodate a shaft of square cross-section. Thus, the yoke assembly formed by the components of FIGS. 6A and 6B could be substituted for the second yoke assembly 104 of FIGS. 2A and 3, or for the first yoke assembly 102 of FIGS. 2A and 3. More specifically, FIG. 6A shows how top section 114'" includes upper square receiving surfaces 142A, and FIG. 6B shows how bottom section 112'" includes lower square receiving surfaces 142B.

Figure 6C:
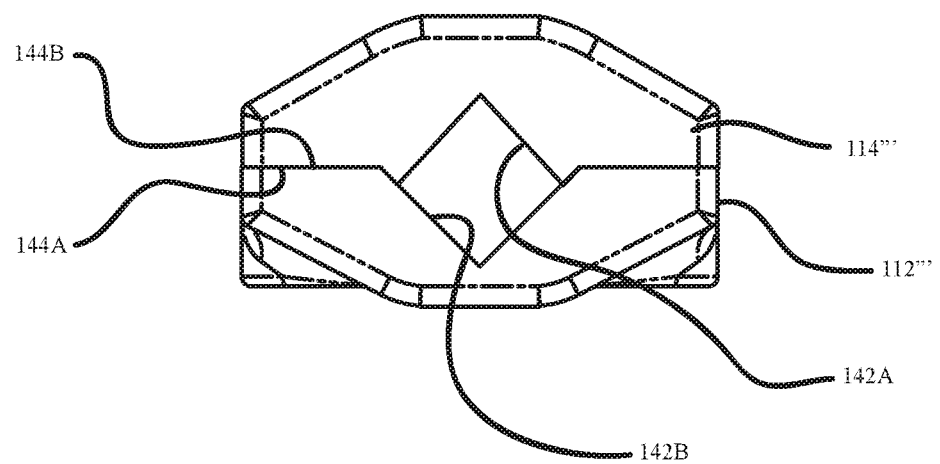
FIG. 6C is a photograph of a model of the yoke assembly of FIGS. 6A and 6B, shown with the top and bottom sections attached to each other.

FIG. 6C is a photograph of a model of the yoke assembly of FIGS. 6A and 6B, shown with the top section 114'" and the bottom section 112'" attached to each other via a plurality of bolts or other known attachment means. It should be noted that the square receiving surfaces 142A and 142B are configured and arranged to accommodate a variety of different shaft sizes, such as ¾ inch square, ⅞ inch square, 1 inch square, as well as the sizes in between the upper and lower limits. Of course, other ranges of sizes are also contemplated. The feature of accommodating different sizes of square shafts is accomplished by varying the amount of space between the facing surfaces 144A and 144B. For example, in the position shown in FIG. 6C, the facing surfaces 144A and 144B are in contact (or near contact) with each other, and thus the square opening defined by receiving surfaces 142A and 142B is configured to receive a square shaft of a size at the smallest value of the appropriate range (such as, for example, ¾ inch square). However, as the space between receiving surfaces 142A and 142B is increased, square shafts of larger and larger sizes within the range can be accommodated, up until reaching the square shaft size at the largest value of the appropriate range (such as, for example, 1 inch square). This feature of being able to accommodate a variety of different shaft sizes with the same receiving section by varying the spacing between the facing surfaces is also available for some of the other embodiments, such as the embodiment of FIG. 4C for when the shaft is inserted when rotated by 45 degrees.

FIG. 7 shows various views of a coupler bolt 150 that can be used for attaching the upper and lower portions (such as portions 114' and 112 of FIGS. 4A and 4B, or the two portions of any of the other embodiments) of the yoke assembly together. Bolt 150 includes a hex head 152, a square washer portion 154, a shaft 156, and a threaded portion 158 at the end of the shaft 156. The square washer portion 154 is configured and arranged to be received within the side apertures 137A/137B of FIGS. 4A and 4B.

Figure 8C:
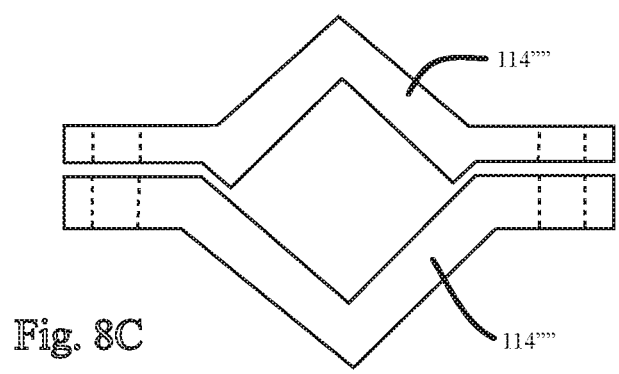
FIG. 8C is another embodiment of a yoke assembly similar to the embodiment of FIGS. 8A and 8B, but with a receiving section of a different cross-section, shown with the two components (the upper section and the lower section) assembled together.

Turning now to FIGS. 8A-8B, another embodiment of the present invention is shown and will be described. The embodiment of FIGS. 8A-8B is an embodiment of the present invention using at least some of the concepts of the present invention in a coupler 200 of the type shown in FIG. 8D and described in U.S. Pat. No. 5,678,772, issued on Oct. 21, 1997, which is hereby incorporated by reference in its entirety. More specifically, FIGS. 8A-8B are various views of another embodiment of the yoke assembly of the present invention, where FIG. 8A shows a perspective view of the upper (main) section 114"", FIG. 8B shows a perspective view of the lower (subsidiary) section 112"". Additionally, FIG. 8C shows an end view of the two components assembled together, but with a receiving section of a different cross-section than that of FIGS. 8A and 8B. As with the other embodiments, two yoke assemblies are used together to make a coupler 100/200. However, in this embodiment, the cloverleaf-shaped resilient insert 106 (FIG. 2) is replaced with a disk-shaped insert, such as resilient disk 115 of FIG. 8D (which is the same as FIG. 2 of U.S. Pat. No. 5,678,772). Briefly, the coupler 200 of FIG. 8D includes a first yoke assembly 102A and a second yoke assembly 104A, wherein the first yoke assembly 102A includes a V-shaped cradle and two or more L-shaped bolts 164 and the second yoke assembly 104A includes cylindrical interlocking members 166 and 168. The yoke assembly of FIGS. 8A and 8B may be substituted for either of the yoke assemblies (102A, 102B) of FIG. 8D, or both yoke assemblies of FIG. 8D may be replaced by the yoke assembly (of any desired receiving cross-section) of FIGS. 8A and 8B.

As can be seen in FIG. 8A, the upper section 114"" includes a pair of ears 159, with each ear 159 including an aperture 160 therein. Additionally, section 114"" also preferably includes a pair of square apertures 161B that align with apertures 161A of section 1112"" of FIG. 8B. Apertures 161A and 161B are configured and arranged to receive bolts for maintaining the shaft fixed in the axial direction within the yoke assembly.

Further, the subsidiary section 114"" of FIG. 8B includes a distal wall 180 and a proximal wall 182, where the proximal wall includes the alignment projections 136 mentioned above. The main section 112"" includes a shoulder portion 184 with alignment notches (not shown, but similar to alignment notches 134 of FIG. 4A). When assembled, the proximal wall 182 of the subsidiary section 114"" (FIG. 8B) opposes the shoulder portion 184 of the main section 112"" (FIG. 8A), and the alignment notches and projections interlock. Further, when assembled, planar surfaces 186 of section 112"" (FIG. 8B) will be opposed to planar surfaces 188 of section 114"" (FIG. 8A) as in the other embodiments. In the embodiments depicted herein, the planar surfaces 188 are perpendicular to the shoulder 184.

Figure 8D:
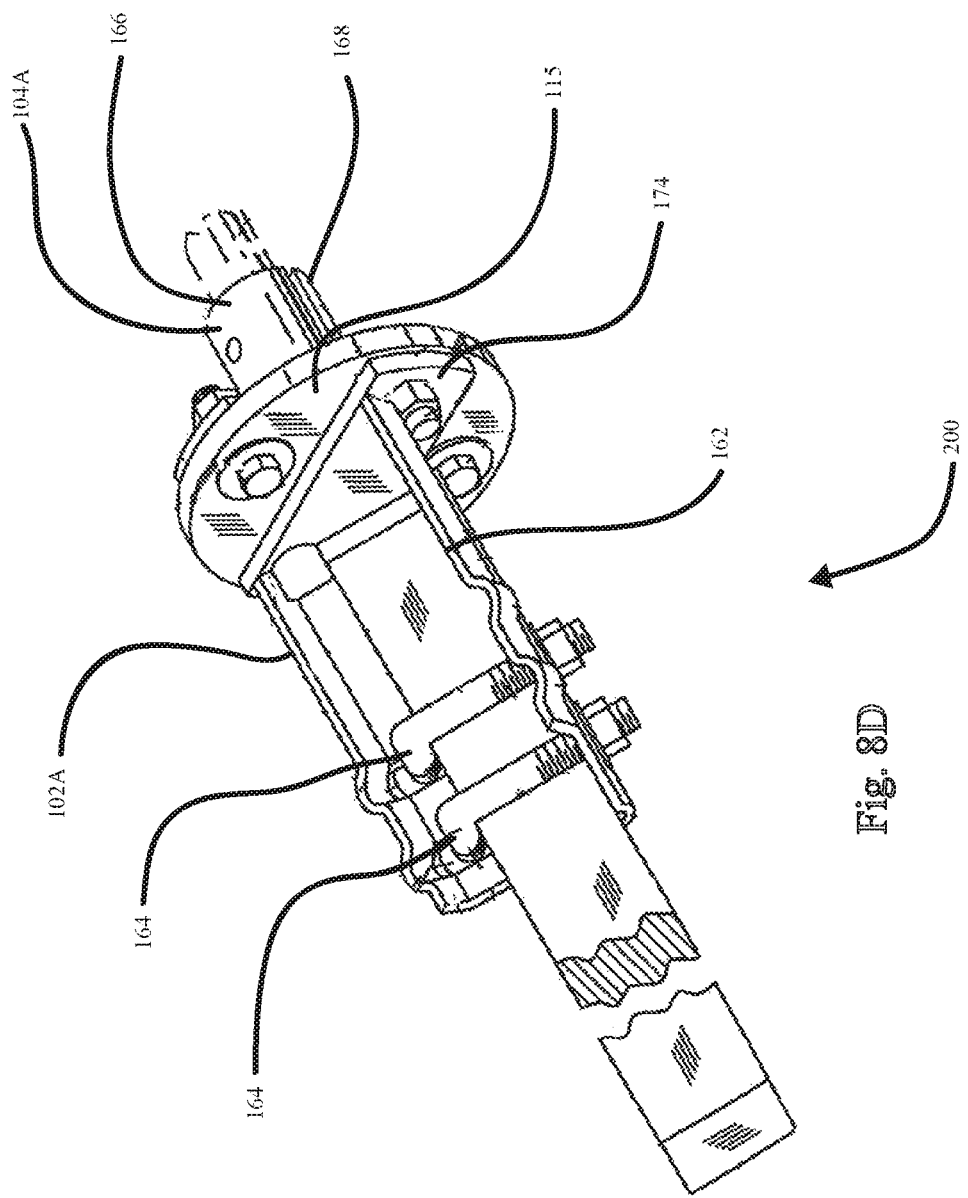
FIG. 8D is an inline coupler into which with the yoke assembly of FIGS. 8A/8B and/or the yoke assembly of FIG. 8C may be substituted into for either, or both, of the yoke assemblies shown.
Figure 8F:
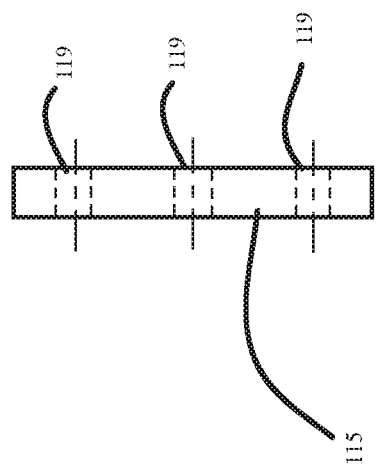
FIGS. 8E and 8F are views of an embodiment of a resilient insert suitable for use with the embodiments of FIGS. 8A-8C, where
Figure 8E:
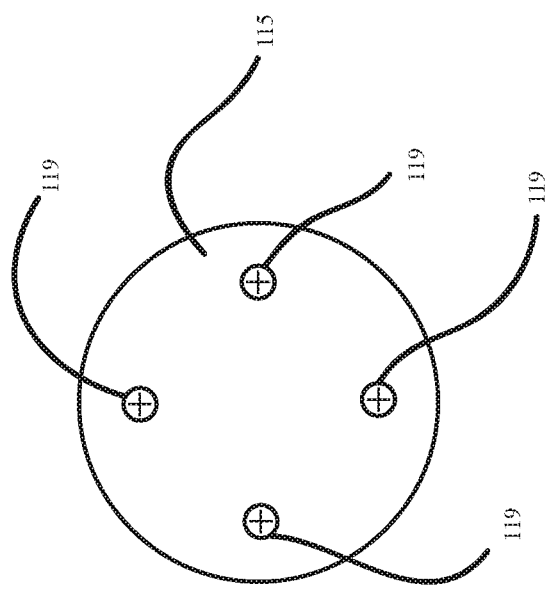

FIG. 8E shows a front view of disk-shaped insert 115, and FIG. 8E is a side view of the same insert 115, where both view show the locations of apertures 119 that are configured and arranged to align with apertures 160 (FIG. 8A) on upper section 114"". In this embodiment, the apertures 160 receive bolts that secure one yoke assembly to the other yoke assembly, with the disk-shaped insert 115 (which includes corresponding apertures) therebetween. Otherwise, the embodiment of FIGS. 8A-8B includes many of the same features as the other embodiments. Of course, the receiving section of the embodiment of FIGS. 8A-8B may be configured of any desired cross section.

Figure 9:
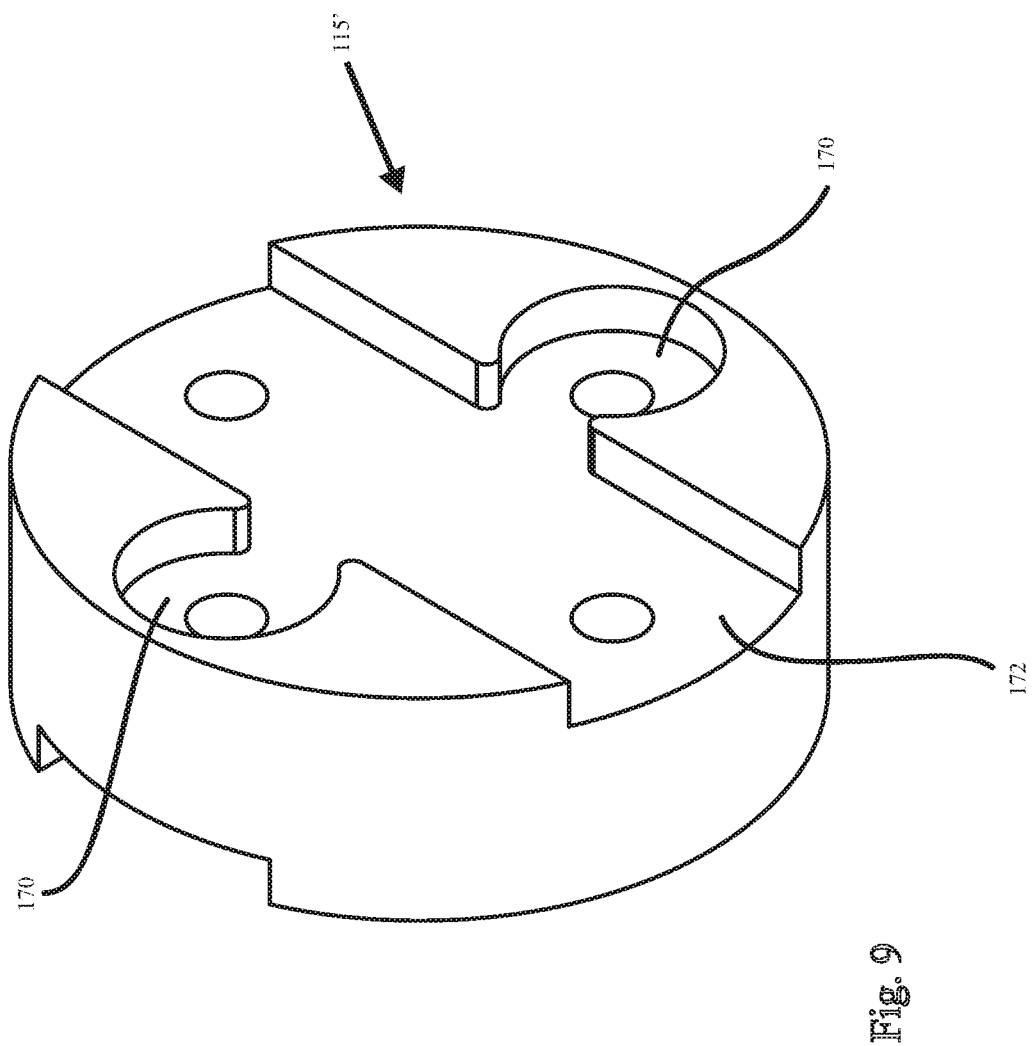
FIG. 9 is a front view of another embodiment of a resilient insert suitable for use with the inline coupler of FIG. 8D, and thus with the yoke assembly of FIGS. 8A/8B and the yoke assembly of FIG. 8C, as well as with the variations on those yoke assemblies.

Finally, turning now to FIG. 9, this figure shows an alternative embodiment of the disk-shaped insert 115'. In this embodiment, the disk-shaped insert 115' includes first recessed portions 170 that correspond to the shape of the ears 159 of the yoke assembly of FIG. 8A. Accordingly, when the bolts are applied through apertures 160 (FIG. 8A) to affix the components of the coupler together, if yoke 112""/114"" is used, the ears 159 are snugly maintained within first recessed portions 170. Similarly, the insert 115' also includes a second recessed portion 172 that corresponds to the flange portion 174 of the V-shaped cradle 162 of the embodiment of FIG. 8D. Accordingly, if the yoke assembly including the V-shaped cradle 162 is used, the contact between the flange portion 174 and the second recessed portion 172 helps to maintain v-shaped cradle in a fixed position when bolted in place. It should be noted that both sides of the insert 115' may include both recessed portions 170 and 172, and it should also be noted that recessed portions of different shapes can be provided on either side of the disk, depending on the shapes of the corresponding portions of the yoke assemblies.

One of the many benefits of the present yoke assembly is that the same yoke assembly design can be used on both sides of the resilient insert 106 (FIG. 3) or disk-shaped insert 115 (FIG. 8D). Thus, for example, if the coupler is coupling a round shaft to a square shaft, two yoke assemblies of the configuration of FIGS. 5A and 5B can be used. Or, for example, if the coupler is coupling two square shafts (of either the same size or of two different sizes), two yoke assemblies of the configuration of FIGS. 6A and 6B can be used. Alternatively, different types of yoke assemblies can be used on either side of the insert.

While the preferred embodiments are described in connection with a center pivot irrigation system, it should be readily apparent that the universal coupler 100 would be useful in other types of irrigation systems where shafts of varying sizes are employed. Further, the shaft described as having a square cross-section could have a slightly rectangular shape, if desired.

While particular embodiments of the present invention have been shown and described, it will be appreciated by those skilled in the art that changes and modifications may be made without departing from the invention in its broader aspects. For example, without limiting the invention, the illustrated embodiment discloses the universal coupler coupling a drive shaft to a drive wheel gear box. The coupler could equally well be used to couple the square drive shaft to the center drive gear box or in any other situation for inline coupling of a square shaft to another shaft (round, square or rectilinear). Therefore, the aim in the appended claims is to cover all such changes and modifications as fall within the true spirit and scope of the invention. The matter set forth in the foregoing description and accompanying drawings is offered by way of illustration only and not as a limitation.

The invention claimed is:

1. A coupler for connecting a first shaft to a second shaft, wherein the first shaft and the second shaft each extend in an axial direction, the coupler comprising:
a first yoke assembly including a first forked section and a first receiving section, wherein the first receiving section includes a first receiving aperture configured and arranged to receive the first shaft;
a second yoke assembly including a second forked section and a second receiving section, wherein the second receiving section includes a second receiving aperture configured and arranged to receive the second shaft; and
a resilient insert configured and arranged to be seated between said first forked section and said second forked section,
wherein said first yoke assembly includes a first main section and a first subsidiary section,
wherein said first main section and said first subsidiary section are configured and arranged to be joined together to form said first receiving aperture therebetween,
wherein said first subsidiary section extends in the axial direction between a distal wall and a proximal wall,
wherein said first main section includes an intermediate wall that is configured and arranged to face said proximal wall of aid first subsidiary section,
wherein said intermediate wall of said first main section includes one of an alignment projection or a complementary alignment notch and said proximal wall of said first subsidiary section includes the other of said alignment projection or said complementary alignment notch, and further wherein said alignment projection is configured and arranged to mate with said complementary alignment notch, and
wherein said first main section includes the entirety of said first forked section.

2. The coupler according to claim 1, wherein said first forked section includes a pair of legs joined together by a central connecting section.

3. The coupler according to claim 1, wherein:
said alignment projection is formed on said intermediate wall, and said intermediate wall also includes a second alignment projection to thereby define a pair of said alignment projections;
said complementary alignment notch is formed on said proximal wall, and said proximal wall also includes a second complementary alignment notch to thereby define a pair of said complementary alignment notches; and
said pair of said alignment projections is configured and arranged to mate with said pair of said complementary alignment notches.

4. The coupler according to claim 1, wherein said first receiving section is formed by a pair of planar surfaces on said first main section that are configured and arranged to be superposed upon a corresponding pair of planar surfaces on said first subsidiary section.

5. The coupler according to claim 4, wherein each of said first main section and said first subsidiary section includes a pair of corresponding apertures in said associated planar surfaces, and wherein said corresponding apertures are configured and arranged to receive fastening means for securing said main section to said first subsidiary section.

6. The coupler according to claim 1, wherein said first receiving aperture is configured and arranged for receiving both a shaft with a circular cross-section and a shaft with a square cross-section.

7. The coupler according to claim 1, wherein said first receiving aperture is configured and arranged for receiving a square shaft in a first orientation as well as for receiving the same square shaft when rotated by 45 degrees.

8. The coupler according to claim 1, wherein said first receiving aperture is configured and arranged for receiving a first square shaft with sides of a first length as well as a second square shaft with sides of a second length greater than the first length, wherein when receiving the first square shaft, opposing surfaces of said first main section and said first subsidiary section are in contact with each other and wherein when receiving the second square shaft, the opposing surfaces of said first main section and said first subsidiary section are separated from each other.

9. The coupler according to claim 1, wherein:
said alignment projection and a second alignment projection define a pair of said alignment projections;
said complementary alignment notch and a second complementary alignment notch define a pair of said complementary alignment notches; and
said pair of said alignment projections is configured and arranged to mate with said pair of said complementary alignment notches.

10. The coupler according to claim 1, wherein:
said alignment projection extends from said intermediate wall of said first main section; and
said complementary alignment notch is formed in said proximal wall of said first subsidiary section.

11. A yoke assembly for receiving a shaft, the yoke assembly comprising:
a main section including a pair of planar surfaces and a shoulder portion; and
a subsidiary section with a pair of planar surfaces extending between a proximal wall and a distal wall, wherein said subsidiary section is configured and arranged to be seated and securely attached to said first main section such that said proximal wall of subsidiary section opposes said shoulder portion of said main section and said pair of planar surfaces of said main section oppose said pair of planar surfaces of said subsidiary section,
wherein said main section and said subsidiary section are configured and arranged to be joined together to form a receiving aperture therebetween, and
wherein when said main section and said subsidiary section are in an assembled condition, said proximal wall of said subsidiary section is in direct contact with said shoulder portion of said main section.

12. The yoke assembly according to claim 11, wherein said main section further includes an ear portion defined by a pair of outwardly extending ears.

13. The yoke assembly according to claim 11, wherein said shoulder portion of said main section includes one of an alignment projection or a complementary alignment notch and said proximal wall of said subsidiary section includes the other of said alignment projection or said complementary alignment notch, and further wherein said alignment projection is configured and arranged to mate with said complementary alignment notch.

14. The yoke assembly according to claim 11, wherein said shoulder portion of said main section includes a pair of alignment projections and said proximal wall of said subsidiary section includes a pair of complementary alignment notches, and further wherein said pair of alignment projections are configured and arranged to mate with said pair of complementary alignment notches.

15. The yoke assembly according to claim 11, wherein said proximal wall of said auxiliary section includes a pair of alignment projections and said shoulder portion of said main section includes a pair of complementary alignment notches, and further wherein said pair of alignment projections are configured and arranged to mate with said pair of complementary alignment notches.

16. A coupler for connecting a first shaft to a second shaft, wherein the first shaft and the second shaft each extend in an axial direction, the coupler comprising:
a first yoke assembly including a first forked section and a first receiving section, wherein the first receiving section includes a first receiving aperture configured and arranged to receive the first shaft;
a second yoke assembly including a second forked section and a second receiving section, wherein the second receiving section includes a second receiving aperture configured and arranged to receive the second shaft; and
a resilient insert configured and arranged to be seated between said first forked section and said second forked section,
wherein said first yoke assembly includes a first main section and a first subsidiary section,
wherein said first main section and said first subsidiary section are configured and arranged to be joined together to form said first receiving aperture therebetween,
wherein said first subsidiary section extends in the axial direction between a distal wall and a proximal wall,
wherein said first main section includes an intermediate wall that is configured and arranged to face said proximal wall of said first subsidiary section, and
wherein when said first main section and said first subsidiary section of said first yoke assembly are in an assembled condition, at least a portion of said proximal wall of said first subsidiary section is in contact with at least a portion of said intermediate wall of said first main section.

17. The coupler according to claim 16, wherein:
said first subsidiary section extends in the axial direction between a distal wall and a proximal wall,
said first intermediate wall of said first main section is configured and arranged to face said proximal wall of said first subsidiary section, and
said intermediate wall of said first main section includes one of an alignment projection or a complementary alignment notch and said proximal wall of said first subsidiary section includes the other of said alignment projection or said complementary alignment notch, and further wherein said alignment projection is configured and arranged to mate with said complementary alignment notch.

18. The coupler according to claim 17, wherein:
said alignment projection and a second alignment projection define a pair of said alignment projections;
said complementary alignment notch and a second complementary alignment notch define a pair of said complementary alignment notches; and
said pair of said alignment projections is configured and arranged to mate with said pair of said complementary alignment notches.

19. The coupler according to claim 18, wherein:
said pair of alignment projections extends from said intermediate wall of said first main section; and
said pair of complementary alignment notch is formed in said proximal wall of said first subsidiary section.

* * * * *